(12) United States Patent
Hayashi

(10) Patent No.: US 7,584,051 B2
(45) Date of Patent: Sep. 1, 2009

(54) NAVIGATION SYSTEM AND PROGRAM FOR THE SAME

(75) Inventor: Kengo Hayashi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 363 days.

(21) Appl. No.: 11/370,941

(22) Filed: Mar. 9, 2006

(65) Prior Publication Data
US 2006/0224303 A1 Oct. 5, 2006

(30) Foreign Application Priority Data
Mar. 30, 2005 (JP) ............................. 2005-098451

(51) Int. Cl.
G08G 1/0962 (2006.01)
G01C 21/26 (2006.01)

(52) U.S. Cl. ..................... 701/211; 701/202; 701/209; 701/201; 701/206; 340/990; 340/995.2; 340/996; 704/E13.003; 704/270

(58) Field of Classification Search .......... 704/E13.003, 704/270
See application file for complete search history.

(56) References Cited

U.S. PATENT DOCUMENTS

| | | | | |
|---|---|---|---|---|
| 5,910,177 A | * | 6/1999 | Zuber ........................ | 701/202 |
| 6,035,253 A | * | 3/2000 | Hayashi et al. ............. | 701/211 |
| 6,078,865 A | * | 6/2000 | Koyanagi .................... | 701/211 |
| 6,347,280 B1 | | 2/2002 | Inoue et al. | |
| 6,542,811 B2 | * | 4/2003 | Doi ............................ | 701/200 |
| 6,658,352 B2 | | 12/2003 | Abe et al. | |
| 6,748,321 B2 | | 6/2004 | Watanabe et al. | |
| 2004/0204828 A1 | | 10/2004 | Ebi | |
| 2006/0074553 A1 | * | 4/2006 | Foo et al. .................... | 701/212 |

FOREIGN PATENT DOCUMENTS

JP A-2001-74486 3/2001

OTHER PUBLICATIONS

Office Action dated Dec. 19, 2008 in corresponding Chinese patent application No. 2006100716572 (and English translation).

* cited by examiner

*Primary Examiner*—Thomas G Black
*Assistant Examiner*—Lin B Olsen
(74) *Attorney, Agent, or Firm*—Posz Law Group, PLC

(57) ABSTRACT

A navigation system for use in a subject vehicle for organizing a navigation instruction of a navigation route toward a destination in map data includes a closeness determination function for determining that a current position of the subject vehicle from the destination is a predetermined range, and a partial route audio navigation provision function for collectively providing the navigation instruction in an audible manner from the current position of the subject vehicle to the destination based on determination by the closeness determination function.

9 Claims, 4 Drawing Sheets

| ROUTE FEATURE | | VOICE NAVI. COST | SET PHRASE |
|---|---|---|---|
| STATIC | DYNAMIC | | |
| LANDMARK (TYPE:PARK) | PASS BY THE LANDMARK | 0.3 | PASS THROUGH ~PARK |
| | TURN AT THE LANDMARK | 0.35 | TURN L/R AT ~PARK |
| T-SHAPE CROSSING | PASS THROUGH | 0.6 | — |
| | TURN AT THE END | 0.4 | TURN AT THE END |
| TRAFFIC LIGHT | THROUGH | 0.4 | — |
| | TURN | 0.45 | TURN L/R AT Nth LIGHT |
| TWO LANE ROAD | THROUGH | 0.5 | — |
| | TURN | 0.8 | — |
| FOUR LANE ROAD | THROUGH | 0.45 | — |
| | TURN | 0.7 | — |

| ROUTE FEATURE | | VOICE NAVI. COST | SET PHRASE |
|---|---|---|---|
| STATIC | DYNAMIC | | |
| LANDMARK (TYPE:PARK) | PASS BY THE LANDMARK | 0.3 | PASS THROUGH ~PARK |
| | TURN AT THE LANDMARK | 0.35 | TURN L/R AT ~PARK |
| T-SHAPE CROSSING | PASS THROUGH | 0.6 | — |
| | TURN AT THE END | 0.4 | TURN AT THE END |
| TRAFFIC LIGHT | THROUGH | 0.4 | — |
| | TURN | 0.45 | TURN L/R AT Nth LIGHT |
| TWO LANE ROAD | THROUGH | 0.5 | — |
| | TURN | 0.8 | — |
| FOUR LANE ROAD | THROUGH | 0.45 | — |
| | TURN | 0.7 | — |

| FACILITY NAME | POSITION ETC. | DEGREE OF DISTINCTION | SET PHRASE |
|---|---|---|---|
| A TOWER | ... | 10 | AT THE FOOT OF |
| B BLDG. | ... | 3 | IN THE BLOCK OF |
| C AMUSEMENT | ... | 8 | NEAR |
| D PARK | ... | 5 | BY |

NAVIGATION SYSTEM AND PROGRAM FOR THE SAME

CROSS REFERENCE TO RELATED APPLICATION

This application is based on and claims the benefit of priority of Japanese Patent Application No. 2005-98451 filed on Mar. 30, 2005, the disclosure of which is incorporated herein by reference.

FIELD OF THE INVENTION

The present invention generally relates to a navigation system.

BACKGROUND OF THE INVENTION

Conventionally, a navigation system for use in a subject vehicle provides navigation instructions for an occupant in the subject vehicle by optimally calculating a navigation route toward a destination. Japanese Patent Document JP-A-2001-74486 discloses the navigation system that provides the navigation instruction by using an audio sound or by displaying a map. The navigation system finishes provision of standard navigation instructions, which are generally provided by using a voice in an audible manner, when the subject vehicle is located in the proximity of the destination, and the navigation system displays a detailed map of the destination including the destination and a current position of the subject vehicle.

However, the occupant, or a driver of the subject vehicle, has to repeatedly gaze the detailed map displayed on the navigation system to grasp the navigation instructions in the map after the provision of the standard navigation instructions has finished. Therefore, the driver of the subject vehicle has inconvenience in terms of receiving instructions from the navigation system.

Further, the navigation system occasionally provides the navigation route that is too complicated to be recognized at a glance of the instructions on the map, or to be understood by using the audio sound, or by using other instruction means.

Furthermore, the navigation instruction provided by the system is occasionally vague for the driver when the destination, e.g., a private house or the like, has no particular feature in appearance. Therefore, the driver of the vehicle cannot proceed with certainty toward the destination by merely obeying the navigation instructions provided by the navigation system.

SUMMARY OF THE INVENTION

In view of the above-described and other problems, the present invention provides a navigation system that can deliver detailed navigation instructions toward a destination of a navigation route for an occupant or a driver of a subject vehicle without causing inconvenience for the occupant as the subject vehicle approaches the proximity of the destination.

The present invention also provides the navigation system that delivers a simple navigation instruction toward the destination. That is, the navigation system delivers the navigation instructions free from complication for the driver's convenience.

The present invention also provides the navigation system that delivers the navigation instructions to be understood by the occupant, or the driver of the subject vehicle, with certainty that the subject vehicle is traveling in the proximity of the destination when the subject vehicle approaches the destination.

The navigation system of the present invention includes a closeness determination function for determining that a current position of the subject vehicle from the destination is a predetermined range, and a partial route audio navigation provision function for collectively providing the navigation instruction in an audible manner from the current position to the destination based on determination by the closeness determination function.

The navigation system of the present invention provides navigation instruction from the current position to the destination in a collective manner by using a voice when the subject vehicle enters into a predetermined range of the destination. Therefore, the driver of the subject vehicle can have a detailed navigation instruction only by listening the navigation instruction.

In another aspect of the present invention, the navigation system includes a route calculation function for calculating a navigation route toward the destination from a position within the predetermined range of the destination, the navigation route having a lower audio navigation cost that represents degree of difficulty of provision of the navigation instruction in the audible manner in comparison with a plurality of the navigation routes toward the destination. The audio navigation provision function collectively provides the navigation instruction in the audible manner for the navigation route calculated by the route calculation function.

The navigation system chooses the navigation route of which navigation instructions can be provided with comparative ease relative to other navigation routes toward the destination. Therefore, simplicity of the navigation instructions provided by the navigation system is maintained. Further, the simplicity of the navigation instructions leads to an improved drivability of the navigation route, that is, the navigation route provides lower possibility for the driver to be mis-navigated. Therefore, the driver of the subject vehicle is less likely to be lost.

In yet another aspect of the present invention, the navigation system includes the route calculation function that calculates a lower audio navigation cost for the navigation route having a traffic signal along a path toward the destination compared to the audio navigation cost for the navigation route having no traffic signal. In this manner, the navigation system may provide the navigation route having a traffic signal as a more "guidable" or appropriate route that has an increased degree of guidance (navigation instruction) understandability. In this case, the path may be a straight route or a route having turning.

In still yet another aspect of the present invention, the navigation system includes the route calculation function that calculates a lower audio navigation cost for the navigation route in an inversely proportional manner to a number of lanes in a section of the navigation route. In this manner, the navigation system may provide a route having greater number of lanes as the more guidable route.

In still yet another aspect of the present invention, the navigation system includes the route calculation function that calculates a lower audio navigation cost for the navigation route in an inversely proportional manner to a number of facilities registered in a section of the navigation route in the map data. In this manner, the navigation system may provide a navigation route having roadside facilities as the more guidable route.

In still yet another aspect of the present invention, the navigation system includes a whole navigation route calculation function for calculating a whole navigation route from a start point of navigation toward the destination, and a navigation provision function for providing the navigation instruction to a position within the predetermined range of the destination based on the navigation route calculated by the whole navigation route calculation function. In this manner, the navigation system collectively provides a proximity area instruction after finishing the provision of the standard navigation instructions to the proximity area of the destination. Therefore, the driver of the subject vehicle is less likely to be in a state of uncomfortableness because of the termination of the standard navigation instructions without detailed navigation instructions toward the destination in the proximity of the destination.

In still yet another aspect of the present invention, the navigation system includes an easy route determination means for determining an easy route, or a simpler route, that has a lower audio navigation cost compared to other navigation routes. The "easy" route leads toward the destination from outside of the predetermined range of the destination. The navigation system also includes a connection route calculation function for calculating a connection route that leads to the navigation route determined by the easy route determination function. In this manner, the navigation system determines a more guidable route in terms of the audio navigation cost for the provision of the audio navigation instructions in a collective manner for the proximity area of the destination in the first place, and calculates the navigation route to a start point of the more guidable route located on a boundary of the proximity of the destination. That is, variation of choices of the navigation routes having a lower audio navigation cost in the proximity of the destination is increased. In other words, possibility for finding the more guidable route, i.e., the route having lower audio navigation cost, is increased.

In still yet another aspect of the present invention, the navigation system includes a navigation route evaluation function for determining a navigation route having a lowest audio navigation cost in comparison with a plurality of the navigation routes toward a destination, and a navigation instruction provision function for providing the navigation instructions for the navigation route determined by the navigation route evaluation function. In this manner, the navigation system chooses the navigation route having lower audio navigation cost as the navigation route toward the destination. Therefore, simplicity of the navigation instructions provided by the navigation system is maintained. Further, the simplicity of the navigation instructions leads to an improved drivability of the navigation route, that is, the navigation route provides lower possibility for the driver to be mis-navigated. Therefore, the driver of the subject vehicle is less likely to be lost.

In still yet another aspect of the present invention, the navigation system includes a facility search function for searching a facility within a predetermined range of a destination by using facility data having position attribute and landmark index. In this case, the landmark index represents evaluation of distinction of the facility as a landmark. The navigation system also includes a navigation instruction function for providing navigation instructions with reference to the facility searched by the facility search function, the facility having higher landmark index relative to other facilities based on the facility data. In this manner, the navigation system provides the navigation instructions in a voice with reference to a facility that has a higher degree of distinction. Therefore, the user, e.g., the driver of the subject vehicle, can recognize that the destination is very close to the current position of the subject vehicle with certainty.

In still yet another aspect of the present invention, a program for the navigation system includes a closeness determination procedure for determining that a current position of the subject vehicle from the destination is a predetermined range, and an audio navigation provision procedure for collectively providing the navigation instruction in an audible manner from the current position to the destination based on determination by the closeness determination procedure. The present aspect of the present invention described above can be grasped as a computer program for operating the navigation system.

In still yet another aspect of the present invention, a program for the navigation system includes a navigation route evaluation procedure for determining a navigation route having a lower audio navigation cost in comparison with a plurality of the navigation routes toward a destination, wherein the audio navigation cost represents evaluation of difficulty of provision of navigation instructions in an audible manner, and a navigation instruction provision procedure for providing the navigation instructions for the navigation route determined by the navigation route evaluation procedure. The present aspect of the present invention described above can be grasped as a computer program for operating the navigation system.

In still yet another aspect of the present invention, a program for the navigation system includes a facility search procedure for searching a facility within a predetermined range of a destination by using facility data having position attribute and landmark index, wherein the landmark index represents evaluation of distinction of the facility as a landmark, and a navigation instruction procedure for providing navigation instructions with reference to the facility searched by the facility search procedure, the facility having higher landmark index relative to other facilities based on the facility data. The present aspect of the present invention described above can be grasped as a program for operating the navigation system.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. A navigation system of the present invention is intended for use in a subject vehicle such as an automobile or the like.

First Embodiment

Figures 1, 2:
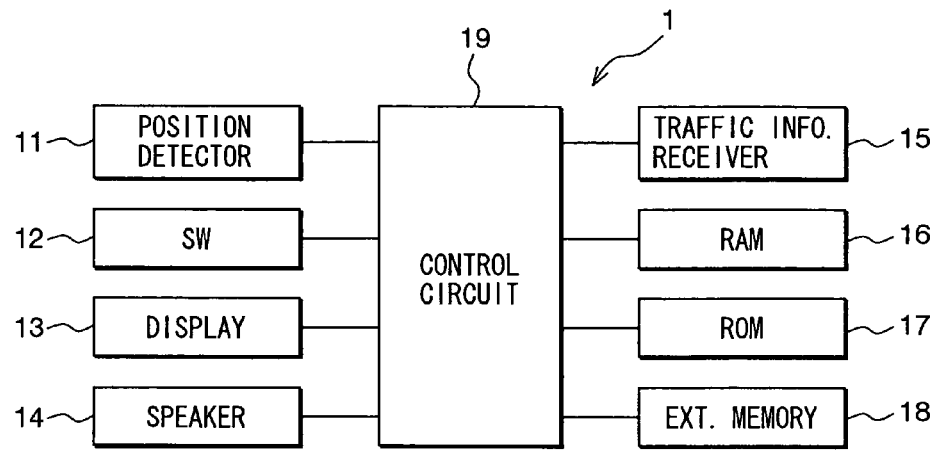
FIG. 1 shows a block diagram of a navigation system for use in a subject vehicle in an embodiment of the present invention.
FIG. 2 shows a voice navigation cost weighting table of the navigation system.

FIG. 1 shows a block diagram of the navigation system 1 in a first embodiment of the present invention. The navigation system 1 in the present embodiment calculates a navigation route to a destination that can be navigated with simple instructions when the subject vehicle approaches the proximity of the destination. The navigation system provides navigation instructions for the calculated navigation route in a collective manner as brief voice instructions. The navigation system 1 includes a position detector 11, operation switches 12, a display 13, a speaker 14, a traffic information receiver 15, a RAM 16, a ROM 17, an external memory 18 and a control circuit 19.

The position detector 11 includes a plurality of sensors such as a geomagnetism sensor, a gyro scope, a speed sensor, and a Global Positioning System (GPS) receiver and the like, which are not shown in the figure. The position detector 11 outputs information on a current position and a traveling direction of the subject vehicle to the control circuit 19 based on the characteristics of those various sensors.

The operation switches 12 are, for example, disposed as touch switches or mechanical switches on the display 13, and are used for inputting various kinds of instruction for the control circuit 19.

The display 13 displays an image based on a signal from the control circuit 19 for a user, e.g., a driver of the subject vehicle. The image displayed on the display 13 may be, for example, a map having a current position mark of the subject vehicle at its center.

The traffic information receiver 15 receives information on traffic congestion, traffic regulation or the like transmitted from a road side station, and outputs the information to the control circuit 19.

The external memory 18 includes non-volatile memory medium such as a DVD, a CD, an HDD or the like with accompanied device for reading and writing (if possible) data from/to those media. The external memory 18 stores a program that is retrieved and executed by the control circuit 19, map data for navigation instructions and the like.

The map data includes road data that is defined by using a link and a node, and the link and the node are defined by their positions, types, connection relationships and the like. The map data also includes facility data. The facility data includes facility attributes such as a facility name, a facility position, a facility type, a facility size, a facility appearance and the like for each of the facilities.

The map data used in the present embodiment includes a voice navigation cost weighting table as shown in FIG. 2. The voice navigation cost weighting table defines a "cost" for providing voice navigation instructions about a "route feature" along or on the navigation route such as a landmark, a facility or the like.

The cost for the voice navigation instruction is defined in proportion to the degree of "difficulty" of provision of the voice navigation instruction about the route feature, that is, for example, in proportion to the length of time required for the provision of the voice navigation instruction or the like. The weighting table also defines relationships between the route feature and a set phrase used for providing the voice navigation instruction about the route feature. The route feature is, in this case, defined as a combination of a static feature and a dynamic feature of the navigation route. That is, the static feature of the navigation route is, for example, structurally defined by using a road feature or a feature of the surroundings of the road, and the dynamic feature is defined, for example, by using a state of traveling of the subject vehicle such as passing by the static feature, turning at the static feature or the like.

For example, the cost for the voice navigation instruction for a turn at a park is defined as a value of 0.35, and the set phrase of the voice navigation instruction in this situation sounds like "Turn right (or left) at the park." Another example may be a straight passage of an intersection that has a traffic signal. In this case, the cost for the voice navigation instruction is defined as a value of 0.4. Further, the cost for the voice navigation instruction of entrance into a road after turning from a four lane road is, for example, a value of 0.7.

The control circuit 19, i.e., a computer, executes a program for operating the navigation system 1 after retrieving the program from the ROM 17 or the external memory 18. In the course of the execution of the program, the control circuit 19 retrieves information from the RAM 16, the ROM 17 and the external memory 18, and writes the information to the RAM 16 and the external memory 18. The control circuit 19 exchanges a signal with the position detector 11, the operation switches 12, the display 13, and the speaker 14.

The control circuit 19 executes following practical processes such as a current position determination process, a navigation route calculation process, a navigation instruction provision process or the like by using the program.

The current position determination process is a process that determines the current position and the traveling direction of the subject vehicle based on the signal from the position detector 11 by using a well-known technology of map matching or the like.

The navigation route calculation process is a process that calculates a navigation route from the current position of the subject vehicle to the destination upon receiving a destination input from the operation switches 12 by the user, or the driver of the subject vehicle.

Figure 3:
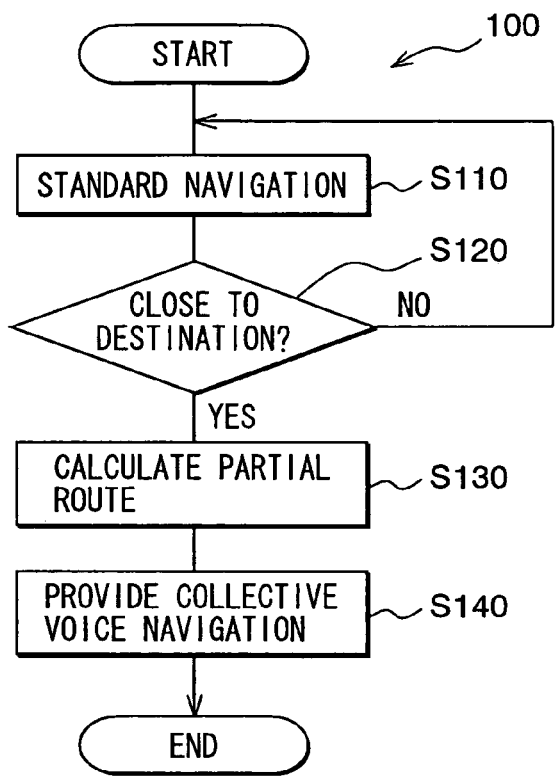
FIG. 3 shows a flowchart of a navigation program executed in the navigation system.

The navigation route calculation process is realized or implemented by the execution of the navigation program 100 by the control circuit 19. FIG. 3 shows a process of the navigation program 100. The process of the program 100 starts with step S100 for a standard navigation instruction for the navigation route. The standard navigation instruction includes displaying of the map on the display 12, the map having calculated navigation route, a destination, a current position and the like included therein based on the map data retrieved from the external memory 18, accompanied by outputting of a voice navigation signal to the speaker 14 for a required voice instruction of turning, for example, at an intersection or the like. The control circuit 19 repeats the standard navigation instruction until the subject vehicle approaches the proximity of the destination, that is, within a predetermined range from the destination in step S120.

The proximity of the destination is defined as being within the predetermined range of the destination, or as being fittingly satisfying a criterion of closeness. That is, for example, the criterion may be a direct distance within a predetermined value of distance from the destination, a route distance within the predetermined value of distance from the destination, or a travel time to the destination by using a representative speed (an average speed, a modal (most frequently appeared) speed or the like) within the predetermined amount of time. The predetermined value of distance or the predetermined amount of time may be a fixed value/amount such as a distance of 300 meters/a period of 1 minute, or a changing value/amount according to a situation such as a current time of the day, degree of traffic congestion at the current position of the road or the like. The predetermined value/amount may also be a randomly selected value/amount within a range of values. Thus, the proximity of the destination is defined as a set of positions that satisfies the criterion of closeness to the destination.

The process of the program 100 in step S120 finishes the standard navigation instruction when the subject vehicle is determined to be within the proximity of the destination, and the process proceeds to step S130 for calculating the navigation route from the current position to the destination, that is, a route from a position on a boundary line of the proximity area of the destination to the destination. The navigation route within the proximity of the destination is designated as a "partial route" in the following description, and the "partial route" is calculated as a navigation route having a minimum voice navigation instruction cost among a plurality of the navigation routes from the boundary of the proximity to the destination. In other words, the cost of the voice navigation instruction for the partial route, or a "total voice navigation cost" is minimized for an optimum partial route.

The total voice navigation cost for each of the plurality of the navigation routes (i.e. partial routes) in the proximity of the destination is determined by using the map data and a voice navigation weighting table in FIG. 2. More practically, the navigation route is first dividingly defined as a combination of turning points and sections between the two adjacent turning points, and the total voice navigation cost is calculated by adding respective costs for each of the turning point and the section in the navigation route. The total voice navigation cost can be formulated as follows.

(The total voice navigation cost of a navigation route) =

(Total voice navigation cost for turning points in the route) +

(Total voice navigation cost for sections between the turning points in the route)

In this case, a lowest cost value of an applicable route feature is used for the calculation of the total voice navigation cost for a turning point in the navigation route. That is, for example, the voice navigation cost for a turning point is defined as 0.7 in the table in FIG. 2 when a turning point is connected with the four lane road, and the voice navigation cost for the same turning point is 0.45 in the table in FIG. 2 when the turning point has a traffic light. As a result, the voice navigation cost for this turning point is determined as 0.45 in this case.

The voice navigation cost for a section of the navigation route is defined as an average cost of the applicable route features in the table in FIG. 2.

Figure 4:
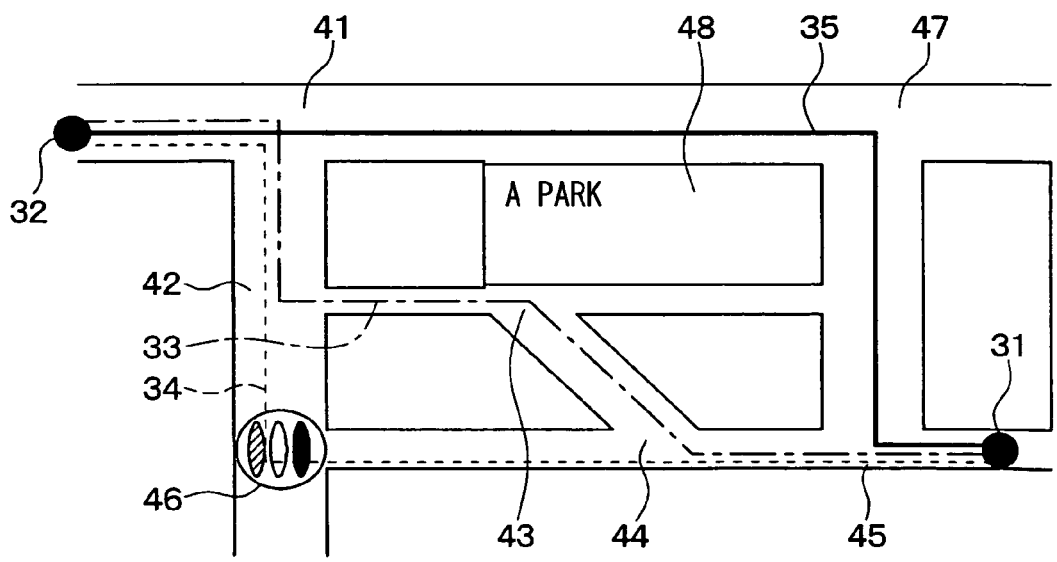
FIG. 4 shows an illustration of a navigation route in the proximity of a destination.

The following is three examples of the calculation of the total voice navigation cost of the partial route. The partial routes used in the examples are shown in FIG. 4. That is, navigation routes 33, 34, 35 are respectively defined as the partial route from a point 32 to a destination 31 in the proximity of the destination 31.

The route 33 starts at the point 32 on the boundary of the proximity of the destination, proceeds to an intersection 41 on a four lane road, turns right at the intersection 41, proceeds to an intersection 42 on the four lane road before turning left at the intersection 42, proceeds to a Y-shape intersection 43 on a two lane road before turning right at the intersection 43, proceeds to a junction 44 on the two lane road before turning left at the junction 44, and proceeds straight through an intersection 45 on the two lane road toward the destination 31. Therefore, the total voice navigation cost for the route 33 is a sum of the following items (A1) to (A5) and (B1) to (B4).

(A1) the voice navigation cost for a section from the point 32 on the boundary of the proximity to the intersection 41=0.45 (a four lane road)

(A2) the voice navigation cost for a section from the intersection 41 to the intersection 42=0.45 (a four lane road)

(A3) the voice navigation cost for a section from the intersection 42 to the intersection 43=0.5 (a two lane road)

(A4) the voice navigation cost for a section from the intersection 43 to the intersection (junction) 44=0.5 (a two lane road)

(A5) the voice navigation cost for a section from the intersection (junction) 44 to the destination 31={0.5(a two lane road)+0.6(a T-shape intersection:through)+0.5(a two lane road)}/3=0.53

(B1) the voice navigation cost at the intersection 41=0.7 (turning right from a four lane road)

(B2) the voice navigation cost at the intersection 42=0.7 (turning left from a four lane road)

(B3) the voice navigation cost at the intersection 43=0.8 (turning right from a two lane road)

(B4) the voice navigation cost at the intersection 44=0.8 (turning left from a two lane road)

Thus, the total voice navigation cost for the route 33 is determined to be a value of 5.43.

The route 34 proceeds from the point 32 to the intersection 41 on the four lane road, turns right at the intersection 41, proceeds to an intersection 46 with the traffic light on the four lane road to turn to the left, and proceeds on the two lane road to the destination 31. Therefore, the total voice navigation cost for the route 34 is a sum of the following items (C1) to (C3) and (D1) to (D2).

(C1) the voice navigation cost for a section from the point 32 on the boundary of the proximity to the intersection 41=0.45 (a four lane road)

(C2) the voice navigation cost for a section from the intersection 41 to the intersection 46={0.45(a four lane road)+0.6(a T-shape intersection:through)+0.45(a four lane road)}/3=0.5

(C3) the voice navigation cost for a section from the intersection 46 to the destination 31={0.5(a two lane road)+0.6(a T-shape intersection:through)+0.5 (a two lane road)}/3=0.53

(D1) the voice navigation cost at the intersection 41=0.7 (turning right from a four lane road)

(D2) the voice navigation cost at the intersection 46=0.45 (turning left from a four lane road at a traffic light)

Thus, the total voice navigation cost for the route 34 is determined to be a value of 2.63.

The route 35 proceeds from the point 32 to an intersection 47 on the four lane road, turns right at the intersection 47 beside A park (a facility) 48, proceeds to the T-shape intersection 45 with the traffic light on the four lane road to turn to the left, and proceeds on the two lane road to the destination 31. Therefore, the total voice navigation cost for the route 35 is a sum of the following items (E1) to (E3) and (F1) to (F2).

(E1) the voice navigation cost for a section from the point 32 on the boundary of the proximity to the intersection 47={0.45(a four lane road)+0.6(a T-shape intersection: through)+0.45(a four lane road)+0.3(through a landmark )}/4=0.45

(E2) the voice navigation cost for a section from the intersection 47 to the intersection 45={0.45(a four lane road)+0.3(through a landmark)+0.6(a T-shape intersection:through)+0.45(a four lane road)}/4=0.45

(E3) the voice navigation cost for a section from the intersection 45 to the destination 31=0.5 (a two lane road)

(F1) the voice navigation cost at the intersection 47=0.35 (turning right at a landmark)

(F2) the voice navigation cost at the intersection 46=0.4 (turning right/left at a T-shape intersection)

Thus, the total voice navigation cost for the route 35 is determined to be a value of 2.15.

Therefore, the total voice navigation cost for navigation instructions of the routes 33, 34, 35 becomes lowest for the instructions of the route 35.

In the calculation of the total voice navigation cost of a navigation route, a section of the navigation route having the traffic light contributes less to an increase of the total voice navigation cost in comparison to the section of the navigation route having no traffic light.

Further, the section of the navigation route having many lanes contributes less to the increase of the total voice navigation cost in comparison to the section of the route having fewer lanes.

Furthermore, the section of the navigation route having a landmark thereon contributes less to the increase of the total voice navigation cost in comparison to the section of the route having no landmark. The degree of contribution to the total cost may be dependent on the type of the landmark.

Furthermore, turning at the T-shape intersection, i.e., turning right/left in an orthogonal direction at the end of the intersection, in the navigation route contributes less in comparison to turning at a non T-shape intersection.

The total voice navigation cost is generally in proportion to the number of the turning points in the navigation route.

The process of the program 100 collectively provides detailed navigation instructions for the partial route having the lowest total voice navigation cost determined in the above-described manner in step S140. More practically, the voice navigation instruction data for the partial route is prepared based on the voice navigation weighting table by (1) arranging the set phrases for the partial route determined in step S130 in order of traveling toward the destination, and (2) inserting proper nouns, right/left turning and the like to the set phrase. The voice navigation instruction data is sent to the speaker 14 as a signal. For example, the voice navigation instruction for the route 35 in FIG. 4 is provided from the speaker 14 based on the signal derived from the voice navigation instruction data that sounds "Turn left along A park and go straight. The destination will be reached after turning left at the intersection." The process of the program 100 concludes after step S140. The voice navigation instruction may be accompanied by the detailed map of the proximity of the destination including the current position displayed on the display 13.

The navigation system 1 provides the navigation instructions for the navigation route toward the destination by executing the navigation program 100 until the current position of the subject vehicle satisfies the criterion of closeness to the destination in step S110 and step S120, and, at this point, i.e., on the boundary of the proximity of the destination, the process calculates the partial route that has the lowest voice navigation cost as the navigation route toward the destination in step S130. Then, the voice navigation instruction for the partial route is provided in the collective manner in step S140.

In this manner, the navigation system 1 finishes the standard navigation instruction at the proximity of the destination, and provides the navigation instruction for the rest of the navigation route, i.e., the partial route, in the collective manner without receiving any operation or the like from the user, or the driver of the subject vehicle. Therefore, the driver of the subject vehicle can have the detailed navigation instruction to the destination from the current position in the proximity of the destination. That is, the driver is less likely to be lost in the proximity of the destination.

The navigation system 1 determines the navigation route that can be navigated with relative ease in terms of provision of the voice navigation instruction in the above described manner. Therefore, the simplicity of the voice navigation instruction for the partial route in the proximity of the destination is maintained. In other words, needless complication of the voice navigation instruction is prevented. Further, the simpler voice navigation instruction may generally be identical to the drivability of the road, thereby enabling the driver of the subject vehicle to have less possibility of being lost.

Second Embodiment

The navigation system 1 in a second embodiment of the present invention is described with reference to the drawings. In the present embodiment, the navigation system 1 has a same structure as the one in the first embodiment. The operation of the navigation system 1 is identical with the one in the first embodiment except for the navigation route calculation process. The following description is an explanation of the portion that is different from the first embodiment.

Figure 5:
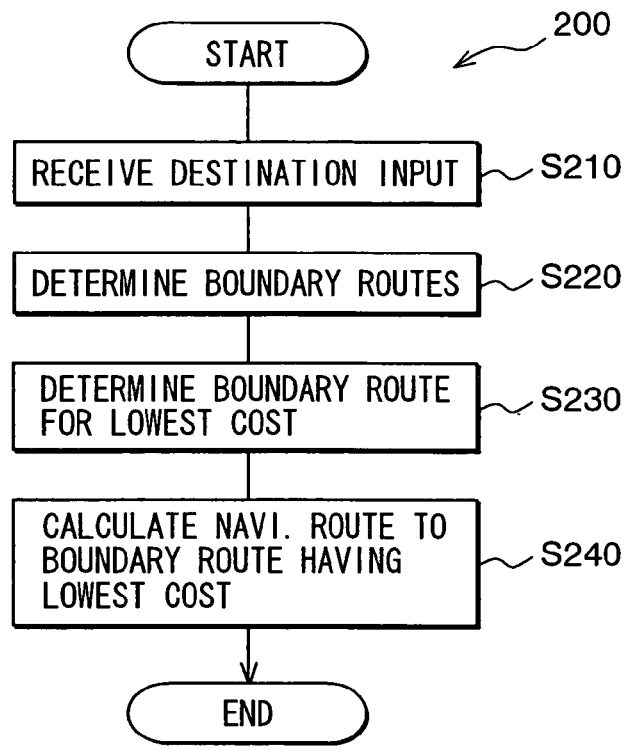
FIG. 5 shows a flowchart of a navigation route calculation program executed in the navigation system.

The control circuit 19 in the present embodiment executes a route calculation program 200 in FIG. 5. The control circuit 19 starts execution of the program 200 after having a certain input to the operation switches 12 by the user, and the process of the program 200 starts with step S210.

In step S210, the process receives a destination input by having an operation to the operation switches 12 by the user.

Figure 6:
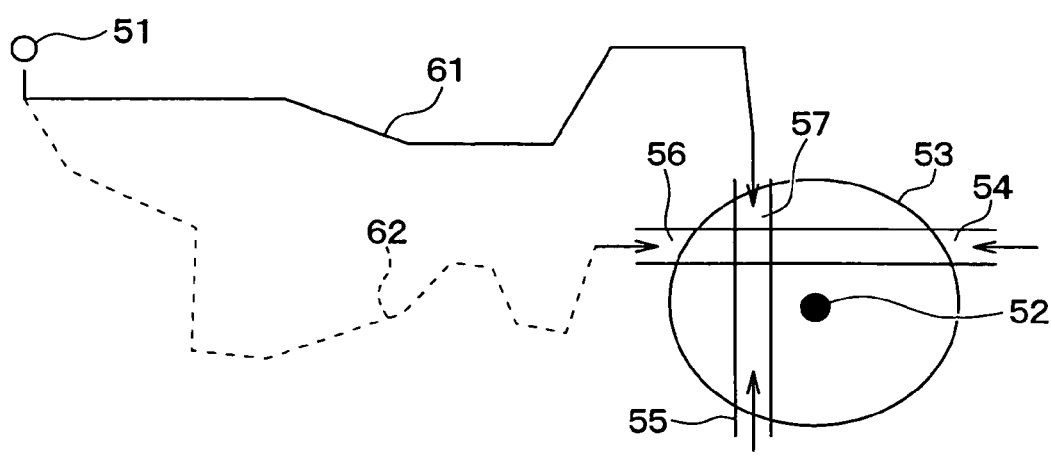
FIG. 6 shows an illustration of the navigation route from a current position to a boundary of the proximity of the destination.

In step S220, the process determines plural "boundary routes" that enters into the proximity of the destination. Examples of the boundary routes is illustrated in a map in FIG. 6. A position 51 is the current position of the subject vehicle when the process receives the destination input. A destination 52 is a center of a circular boundary 53 that defines the proximity of the destination 52. The boundary routes are the routes that cross the boundary 53 for entering into the proximity, that is, routes 54 to 57 are the boundary routes.

In step S230, the boundary route as a start point of a navigation route having the lowest voice navigation cost is determined. The navigation route having the lowest voice navigation cost starts from one of the boundary routes determined in step S220. The total cost of the voice navigation instruction is calculated in the manner described in the first embodiment for determining the route having the lowest cost.

In step S240, the navigation route from the current position to the boundary route determined in step S230 is calculated by using a shortest path calculation algorithm or a similar well-known method. For example, in step S230, the navigation route is calculated as a route 61 when the boundary route in step S230 is determined as the route 57, or the navigation route is calculated as a route 62 when the boundary route in step S230 is determined as the route 56. The navigation route to the boundary route may be determined based on the total voice navigation cost as described in step S130 in the first embodiment. The process of the program 200 concludes after execution of step S240.

In this manner, the route calculation program 200 of the navigation system 1 executed by the control circuit 19 determines the destination (step S210), determines the plural boundary routes (step S220), determines the boundary route that leads to the navigation route having the lowest total voice navigation cost to the destination (step S230), and calculates the navigation route from the current position to the boundary route (step S240).

Thus, the navigation system 1 in the present embodiment can calculate the navigation route to the boundary route that defines a start portion of the navigation route in the proximity of the destination having the lowest voice navigation cost by determining the boundary routes in the first place. In this manner, the range of the choice of the boundary routes is widened, and the navigation route to the boundary route is optimally determined.

Third Embodiment

A third embodiment of the present invention is described with reference to the drawings. In the present embodiment, the navigation system 1 has a same structure as the one in the first embodiment. The operation of the navigation system 1 is identical with the one in the first embodiment except for structure of facility data in the external memory 18 and the navigation route calculation process. The following description is an explanation of the portion that is different from the first embodiment.

The facility data in the present embodiment is different from the one in the first embodiment in an aspect that the facility data includes attributes such as degree of distinctive appearance of the facility and set phrase for description of the facility.

Figures 7, 8:
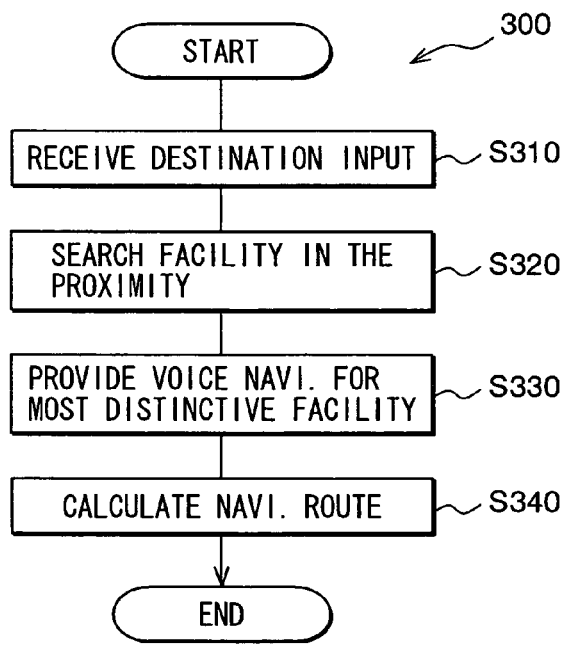
FIG. 7 shows a table of data structure stored in the navigation system.
FIG. 8 shows a flowchart of a navigation route calculation program executed in the navigation system.

FIG. 7 shows an example of facility data table including those attributes. In this example, the degree of distinction of A tower is 10, and the set phrase for the A tower sounds "At the foot of."

The navigation system 1 of the present embodiment includes the control circuit 19 that executes the navigation route calculation program 300. The process of the program 300 is shown in FIG. 8 as a flowchart. The control circuit 19 starts execution of the program 300 after having a certain input to the operation switches 12 by the user, and the process of the program 300 starts with step S310.

In step S310, the process receives a destination input by having an operation to the operation switches 12 by the user.

In step S320, the process searches for facilities in the proximity of the destination by using the facility data. The proximity of the destination may be defined in the same manner as the proximity used in the navigation program 100 or the route calculation program 200. The proximity may be defined as a smaller area than that used in the program 100 or the program 200, e.g., an area within 50 meters from the destination.

In step S330, the process determines the facility that has a highest degree of distinctive appearance. A single facility may be selected based on the distance from the destination when the process finds plural facilities having the same degree of distinctive appearance, or all of the facilities with the same highest degree may be selected together for use in the navigation. Then, the facility data is used to provide the voice navigation instruction for the selected facility(ies), that is, the voice navigation that utilizes the set phrase and the facility name in the facility data is provided from the speaker 14. For example, the voice navigation instruction may sounds like "The destination is at the foot of A tower." or "The destination is in a block of B building."

In step S340, the navigation route to the destination is calculated by using a shortest path calculation algorithm or a similar well-known method. The process in step S340 may be the same process as steps S220, S230, and S240. The process of the program 300 concludes after execution of step S340.

In this manner, the route calculation program 300 of the navigation system 1 executed by the control circuit 19, by using the facility data, determines the destination (step S310), searches the facilities in the proximity of the destination (step S320), provides the voice navigation instruction with reference to the most distinctive facility (step S230), and calculates the navigation route to the destination (step S240).

Thus, the navigation system 1 of the present embodiment can provide the navigation instruction with reference to the distinctive landmark that is closely located to the destination, thereby providing the driver of the subject vehicle for sense of ease or comfort based on a certainty of being close to the destination assured by the distinctive appearance of the facility.

Other Embodiments

Although the present invention has been fully described in connection with the preferred embodiment thereof with reference to the accompanying drawings, it is to be noted that various changes and modifications will become apparent to those skilled in the art.

For example, the navigation system 1 may calculate the navigation route to the destination in the manner used for calculating the partial route in step S130 in the first embodiment when the destination is inputted in the first place. That is, the entire navigation route may be calculated based on the evaluation of the total voice navigation cost for the entire navigation route. The navigation instructions may be provided as the subject vehicle approaches the route feature located along the route by using the set phrases in the navigation cost weighting table.

In this manner, needless complication of the voice navigation instruction for the navigation route is prevented. Further, the simpler voice navigation instruction may generally be identical to the drivability of the road, thereby enabling the driver of the subject vehicle to have less possibility of being lost.

Furthermore, the navigation system 1 may provide a voice guidance that informs conclusion of the standard navigation instruction before executing step S140.

Furthermore, the calculation of the partial route in step S130 may be executed predictably before the subject vehicle enters into the proximity of the destination. That is, the boundary route may be predicted for advanced calculation of the partial route.

Furthermore, provision of the voice navigation instruction in the collective manner may be after a period of time from the entrance of the subject vehicle into the proximity of the destination, instead of just after the entrance into the proximity.

Furthermore, the voice navigation cost for a certain turning point may be determined as an average cost of all applicable route features in the weighting table. In addition, the voice navigation cost for a certain section may be determined as a minimum cost among applicable route features in the weighting table.

Furthermore, the voice navigation cost may be defined for each entry of the route features, or may be defined for respective categories of route features.

Furthermore, the degree of distinctive appearance and/or the set phrase in the facility data may be defined for respective categories of the facility. That is, relationships between the facilities and the degrees of distinctive appearance with the location of the facility may be many-to-one association, as long as every facility has those attribute.

Furthermore, the voice navigation with reference to the distinctive facility may be provided not only at an occasion of the destination input but also at an occasion that the subject vehicle enters into the proximity of the destination.

Furthermore, the map data, the voice navigation weighting cost table and the like may be retrieved from a data server through a network or through communication with a road side station.

Furthermore, the navigation system 1 in the above embodiments may not only be used as the navigation system for a vehicle but also be used as the navigation system having portability for use by human being.

Such changes and modifications are to be understood as being within the scope of the present invention as defined by the appended claims.

What is claimed is:

1. A navigation system for use in a subject vehicle for organizing a navigation instruction of a navigation route toward a destination in map data comprising:
   a closeness determination means for determining that a current position of the subject vehicle from the destination is within a predetermined range;
   a partial route audio navigation provision means for collectively providing the navigation instruction in an audible manner from the current position of the subject vehicle to the destination based on determination by the closeness determination means; and
   a route calculation means for calculating a plurality of navigation routes to the destination from the current position within the predetermined range of the destination and for identifying the navigation route from among the plurality of navigation routes having a lowest audio navigation cost, the audio navigation cost representing a degree of difficulty in provisioning navigation instructions in an audible manner;
   wherein the partial route audio navigation provision means collectively provides the navigation instructions in the audible manner for the identified navigation route.

2. The navigation system according to claim 1,
   wherein the route calculation means calculates the lower audio navigation cost for the navigation route having a traffic signal along a path toward the destination in comparison to the audio navigation cost for the navigation route having no traffic signal along the path toward the destination.

3. The navigation system according to claim 1, wherein the route calculation means calculates the lower audio navigation cost for the navigation route in an inversely proportional manner to a number of lanes in a section of the navigation route.

4. The navigation system according to claim 1,
   wherein the route calculation means calculates the lower audio navigation cost for the navigation route in an inversely proportional manner to a number of facilities registered in a section of the navigation route in the map data.

5. The navigation system according to claim 1 further comprising:
   a whole navigation route calculation means for calculating a whole navigation route from a start point of navigation toward the destination; and
   a navigation provision means for providing the navigation instruction to a position within the predetermined range of the destination based on the whole navigation route calculated by the whole navigation route calculation means.

6. The navigation system according to claim 5,
   wherein the whole navigation route calculation means further comprising:
   an easy route determination means for determining the navigation route that has a lower audio navigation cost compared to a plurality of the navigation routes, wherein the navigation route leads toward the destination from outside of the predetermined range of the destination; and
   a connection route calculation means for calculating a connection route that leads to the navigation route determined by the easy route determination means.

7. A navigation system comprising:
   a navigation route evaluation means for determining a navigation route having a lower audio navigation cost in comparison with a plurality of the navigation routes toward a destination, wherein the audio navigation cost represents evaluation of difficulty of provision of navigation instructions in an audible manner; and
   a navigation instruction provision means for providing the navigation instructions for the navigation route determined by the navigation route evaluation means.

8. A computer program for a navigation system comprising a computer usable medium having computer program logic recorded thereon for enabling generation of a control program in a computer, the computer program logic comprising:
   a closeness determination procedure for determining that a current position of the subject vehicle from the destination is a predetermined range; and
   an audio navigation provision procedure for collectively providing the navigation instruction in an audible manner from the current position to the destination based on determination by the closeness determination procedure; and
   a route calculation procedure for calculating a plurality of navigation routes to the destination from the current position within the predetermined range of the destination and for identifying the navigation route from among the plurality of navigation routes having a lowest audio navigation cost, the audio navigation cost representing a degree of difficulty in provisioning navigation instructions in an audible manner;
   wherein the audio navigation provision procedure collectively provides the navigation instructions in the audible manner for the identified navigation route.

9. A program for a navigation system comprising a computer usable medium having computer program logic recorded thereon for enabling generation of a control program in a computer, the computer program logic comprising:
   a navigation route evaluation procedure for determining a navigation route having a lower audio navigation cost in comparison with a plurality of the navigation routes toward a destination, wherein the audio navigation cost represents evaluation of difficulty of provision of navigation instructions in an audible manner; and
   a navigation instruction provision procedure for providing the navigation instructions for the navigation route determined by the navigation route evaluation procedure.

* * * * *